(12) United States Patent
Fridman

(10) Patent No.: US 6,390,738 B1
(45) Date of Patent: May 21, 2002

(54) TOOL JIG FOR DOORS

(76) Inventor: Yevgeny Fridman, 4235 Ramwick Ct., San Jose, CA (US) 95118

( * ) Notice: Subject to any disclaimer, the term of this patent is extended or adjusted under 35 U.S.C. 154(b) by 0 days.

(21) Appl. No.: 09/545,220

(22) Filed: Apr. 7, 2000

(51) Int. Cl.[7] .............................................. B23B 49/02
(52) U.S. Cl. ................................... 408/103; 408/115 R
(58) Field of Search ..................... 144/27, 84, 144.51; 408/97, 103, 108, 109, 115 R

(56) References Cited

U.S. PATENT DOCUMENTS

| | | | | |
|---|---|---|---|---|
| 2,033,072 A | * | 3/1936 | Harp | 408/104 |
| 2,763,299 A | * | 9/1956 | Cerf, Jr. | 408/115 R |
| 2,792,727 A | * | 5/1957 | McCuen | 408/31 |
| 2,843,167 A | * | 7/1958 | Rushton | 408/115 R |
| 3,212,366 A | * | 10/1965 | Russell et al. | 408/115 R |
| 3,338,277 A | * | 8/1967 | Tornoe et al. | 408/115 R |
| 4,813,826 A | * | 3/1989 | Riedel | 408/115 R |
| 5,479,802 A | | 1/1996 | Miller | 70/663 |
| 5,672,034 A | | 9/1997 | McLean | 408/79 |
| 6,193,449 B1 | * | 2/2001 | Diaz | 408/72 R |

\* cited by examiner

*Primary Examiner*—Daniel W. Howell
(74) *Attorney, Agent, or Firm*—Robert Samuel Smith

(57) ABSTRACT

A drill jig for a door comprising a pair of jaws that clamp onto the edge of a door. The clamp is first attached to the edge of the door by a spring load and then further secured by a cam which the workman turns to apply additional clamping force. A center block between the jaws has a guide hole for drilling the lock hole in the edge of the door. The centerline of the center block is perpendicular to the centerline of the knob hole and is positionable to permit location of the knob hole at either one of two locations depending on the style of the lock set. The center block is hingably attached to both jaws of the clamp such that guide hole for drilling the lock hole is always centered between the jaws.

10 Claims, 6 Drawing Sheets

TOOL JIG FOR DOORS

FIELD OF THE INVENTION

This invention is related to tool jigs for drilling holes and particularly to a tool jig that clamps onto the edge of a door providing a guide for the knob hole and the latch hole required for installing a lockset.

BACKGROUND AND INFORMATION DISCLOSURE

Common procedure for a builder to install a door is to order a door panel that has a standard size knob hole (hole through the door) for receiving the lockset. The hole is typically located near one long edge of the door 36 inches from the bottom edge. The hole is selected to accommoate any one of standard locksets. Installation of the lockset requires that a pattern of holes be drilled by the carpenter in the door proximal to the knob hole through which bolts are inserted to secure the lockset. The position and size of the smaller holes varies according to the lockset selected by the builder.

Alignment of the holes with the edge of the door is very critical for the sake of appearance as well as for ease of installation of the lockset. Consequently, some rather elaborate drill jigs have been disclosed that are available along with the lockset as aides in installing the doors. Such aids are particularly useful when large numbers of doors are being installed such as when erecting large tracts of residences.

The drill jigs of the prior art are typically plates holding an array of drill bushings. In a common jig, a shoulder is positioned along one edge of the plate. The plate is positioned on the door to be drilled with the shoulder abutting an edge of the door. In this manner, the holes to be drilled are aligned with the edge of the door. This arrangement is only satisfactory when all of the doors have their holes located at the same distance from the edge of the door.

In another arrangement, the jig is a channel that straddles the edge of the door with one leg (plate) of the channel on each side of the door. Each plate has an array of drill bushings, each bushing aligned with a bushing in the other plate. This arrangement is satisfactory only when all of the doors have the same thickness.

For example, U.S. Pat. No. 5,116,170 to Palmer et al discloses a drill jig for installing a lockset with a flange for attaching a C-clamp.

U.S. Pat. No. 5,479,802 to Miller discloses a method of installing a combination lock deadbolt assembly with a dial lock.

U.S. Pat. No. 5,672,034 discloses a carpenter's locator for use with a door boring jig.

In many instances the customer requires a second knob with a dead bolt to be installed in a door. In order to install the second lockset, it is necessary to drill additional holes in the door. FIG. 1 is a cutaway prospective view (prior art) of an edge of a door 10 showing the knob hole 12 and a lock hole 14.

Cutting these two extra holes in a door for a custom job presents some complications for the workman even though the holes 12, and 14 are intended to fit an "off-the-shelf" lock set. One difficulty is that there are currently two "standard" locksets and the difference between them is that distance between the knob hole 12 and the edge of the door may be either one of two standard sizes, i. e., 2 inches or 2½ inches. Another problem according to present practice is positioning the lock hole in the center of the surface of the edge of the door with the center line of the lock hole intersecting the centerline of knob hole. The care that must be taken in accurately placing the holes adds a substantial cost to the job particularly in jobs such as apartment complexes where retrofitting a large number of doors is required.

SUMMARY OF THE INVENTION

It is an object of this invention to provide tool jig for a door lock that "snaps onto" the edge of the door to provide a guide for drilling the knob hole and the lock hole where the two holes are accurately aligned with one another. It is contemplated that the tool jig will accommodate a door of any thickness within the range of thicknesses of "standard doors" presently on the market.

This invention is directed toward a pair of jaws that clamp onto the edge of a door. The clamp is first attached to the edge of the door by a spring load and then further secured by a cam which the workman turns to apply additional clamping force. A center block between the jaws has a guide hole for drilling the lock hole in the surface of the edge of the door.

The centerline of guide hole in the center block is perpendicular to the centerline of the knob hole and is positionable to permit location of the knob hole at either one of two locations depending on the style of the lock set. The center block is hingably attached to both jaws of the clamp such that the guide hole in the center block is always centered with the surface of the edge of the door.

Features, aspects and advantages of the present invention will become better understood by reference to the following description of what I presently believe to be the best mode for carrying out the invention illustrated in the accompanying drawings and further defined by appended claims.

DESCRIPTION OF THE BEST MODE

Figure 1:
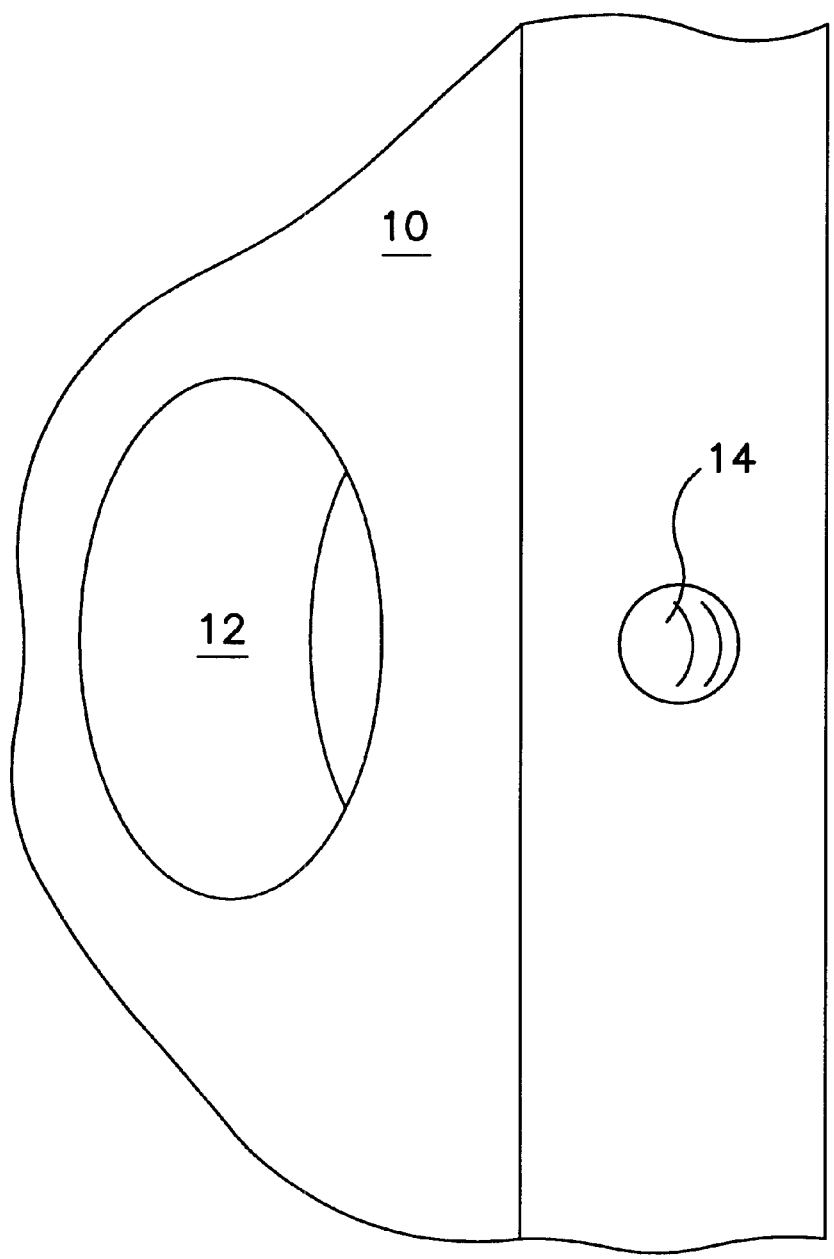
FIG. 1 is a cutaway perspective view of a door edge showing the knob hole and the lock hole.
Figure 2:
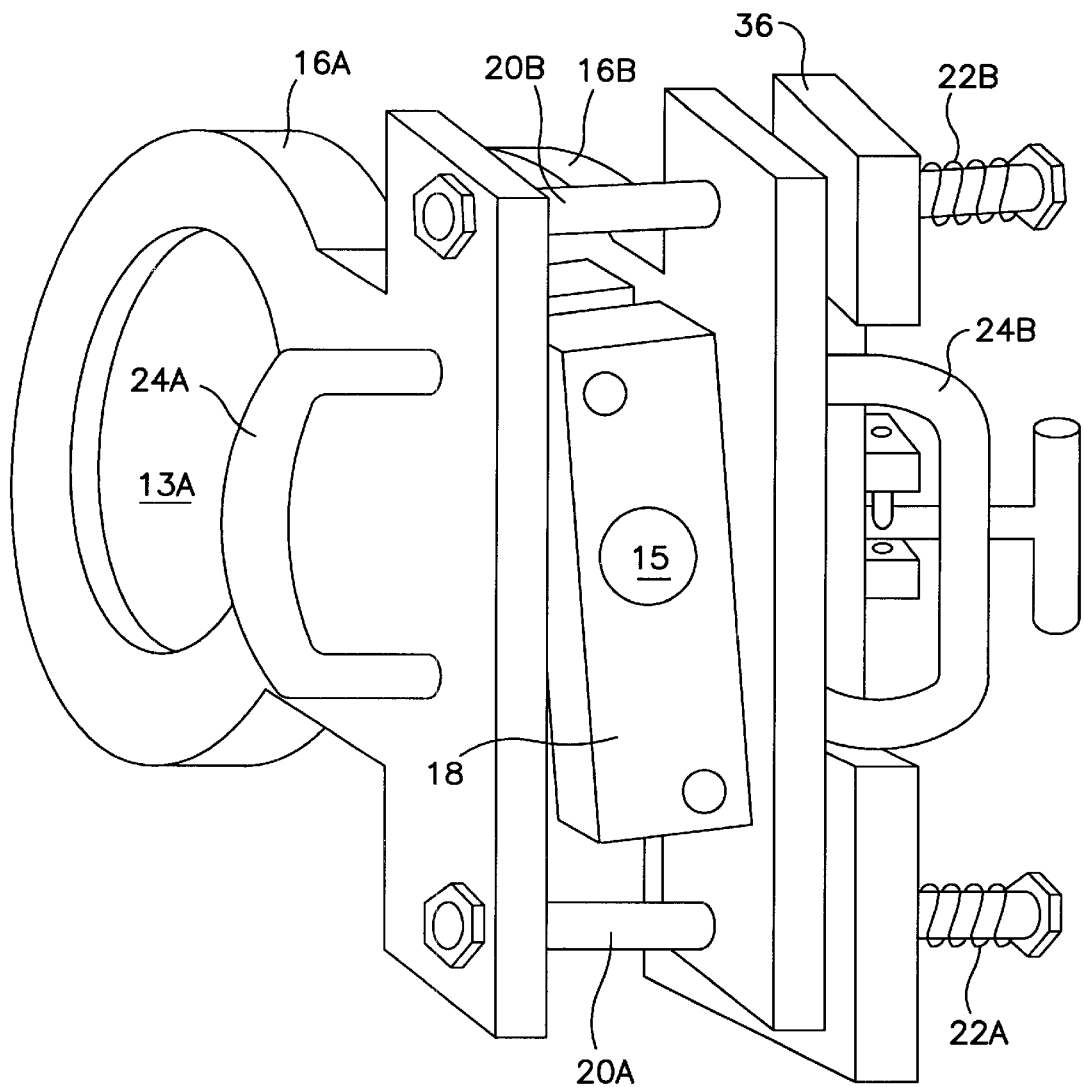
FIG. 2 is a perspective view of the invention.
Figure 3:
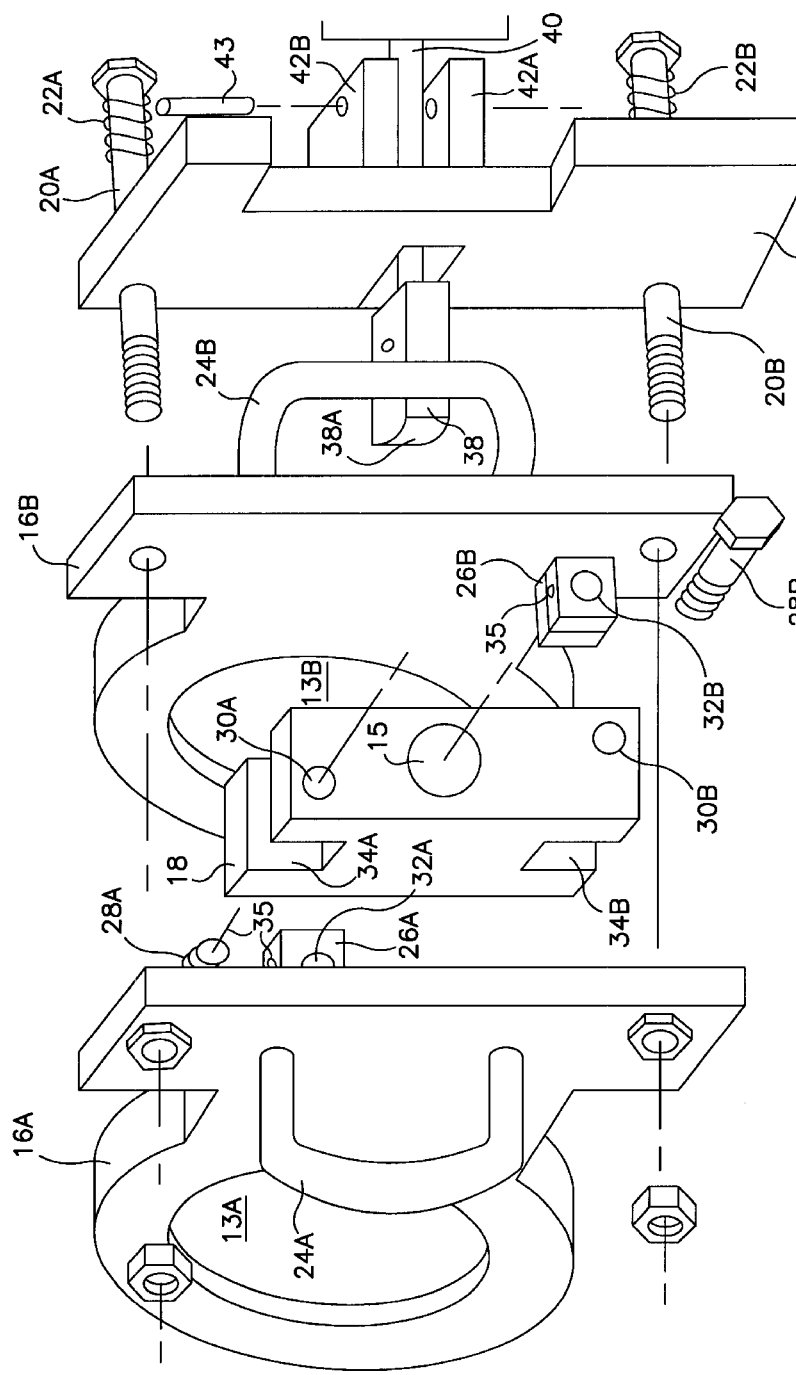
FIG. 3 is an exploded perspective view of FIG. 2.
Figure 4:
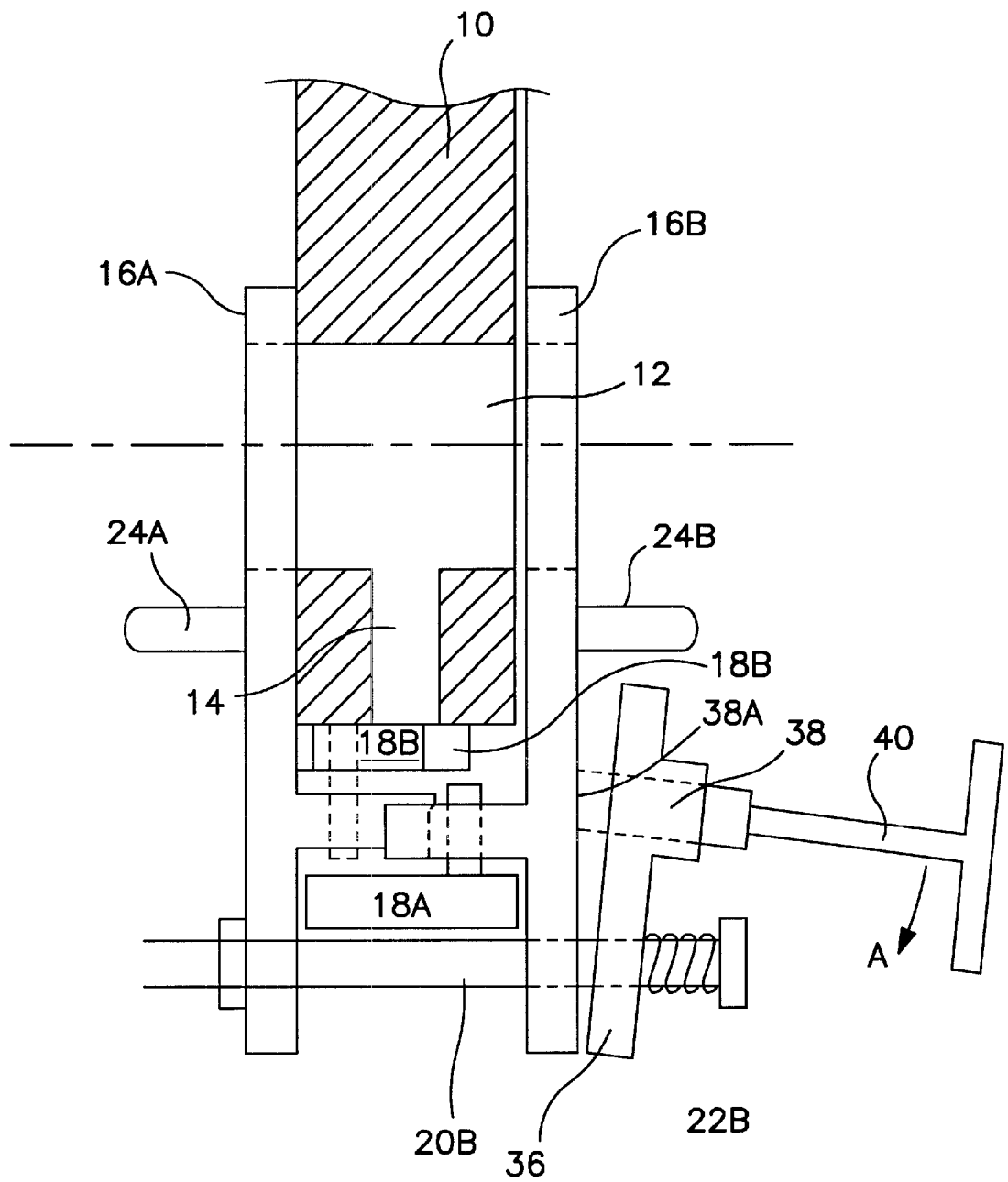
FIG. 4 shows a side view of the invention with the door, shown in section, clamped between the jaws of the invention.

Turning now to a discussion of the drawings, FIG. 1 is an assembly view showing the tool jig clamp of this invention and FIG. 3 is an exploded view of FIG. 1. FIG. 4 is a side view showing a door 10 (in section) with knob hole 12 and lock hole 14 clamped between jaws 16A, 16B.

Jaws 16A, 16B have apertures 13A, B for guiding a hole saw to drill the knob hole 14 and have apertures 17A, B for slidable mounting on rods 20A and 20B. The jaws 16A, B are spring loaded by springs 22A, B to clamp a door 10 between jaws 16A, B as shown in FIG. 4.

A center block 18 is shown having the guide hole 15 for drilling the lock hole 14 in door 10. Ear 26A attached to jaw 16A slids into slot 34A of center block 18 and ear 26B attached to jaw 16B slides into slot 34B attached to jaw 16B of center block 18. Center block 18 has one end pivotally mounted to ear 26 A by pin 28A through apertures 30A an 32A and another end pivotally mounted to ear 26B by pin 28B through apertures 30B an 32B providing that, when the jaws are moved either away or toward one another, the guide hole 15 remains centered between the jaws.

Figure 5:
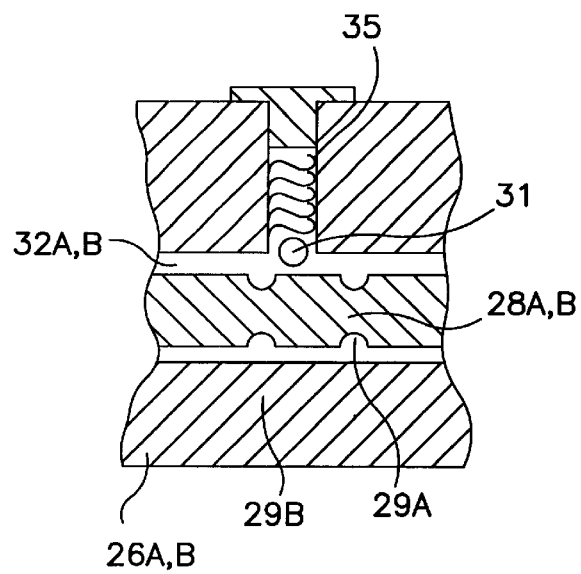
FIG. 5 shows details of the construction for accommodating to either one of two standard locations of the knob hole.

The thickness of ears 26A, B is smaller than slots 34A,B permitting the center block 18 to be slidably positioned between two locations corresponding to two different standard distances to be selected that the knob hole 12 is located from the edge of door 10. Details of the construction for retaining the center block in either location is shown in the sectional view of FIG. 5 showing a ball 31 spring loaded through bore 35 to engage either notch 29A or 29B loaded through bore 35 in ear 26A, B.

The centerblock can thus be snapped in one position or a second position depending on the required distance of the knob hole from the edge of the door when the edge of the door butts against the center block.

A clamping plate 36 is also slidably mounted on rods 20A, B and is forced by springs 22A and 22B to slide against jaw 16B. A cam 38 is mounted on one end of lever 40 which is pivotally mounted by brackets 42A, B and pin 43 onto clamp plate 36 As best shown in FIG. 4, when the jaws 16A,B are forced against the door 10 by springs 22A, B, further locking and clamping is achieved by rotating lever 40 (see arrow A) in FIG. 4 so that cam surface 38 is forced against jaw 16B thereby "cocking" clamp plate 36 and preventing sliding movement of clamping plate 36 on rods 20A, B.

In practice, the workman grasps one handle 24A with one hand and the other handle 24B with his other hand and pulls the jaws 16A and 16B apart. The invention is positioned with one jaw 16A on one side of the door 10 and the other jaw 16B on the other side of the door 10. The edge of the door 10 is positioned against the center block 18 which has been positioned according to the required distance of the knob hole from the edge of the door. When the handles 24A, B are released, the invention is clamped to the door by spring action. Lever is then rotated (in direction A as shown in FIG. 4) to increase the clamping force. The invention on the door is now set permitting the workman to apply a hole saw to drill the knob hole through door 10 guided by the apertures in the drill the knob hole 12 and lock hole 14.

Variations and modification s of the invention may be contemplated after reading the specification and studying the drawings which are within the scope of the invention.

Figure 6:
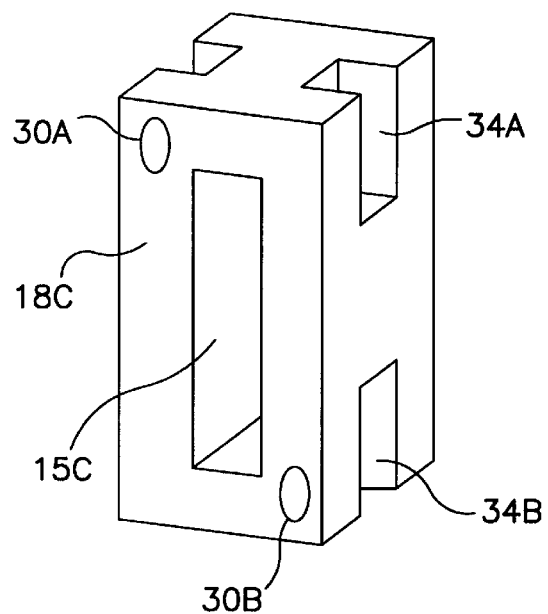
FIG. 6 shows a centerblock with an oblong guide hole.
Figure 7:
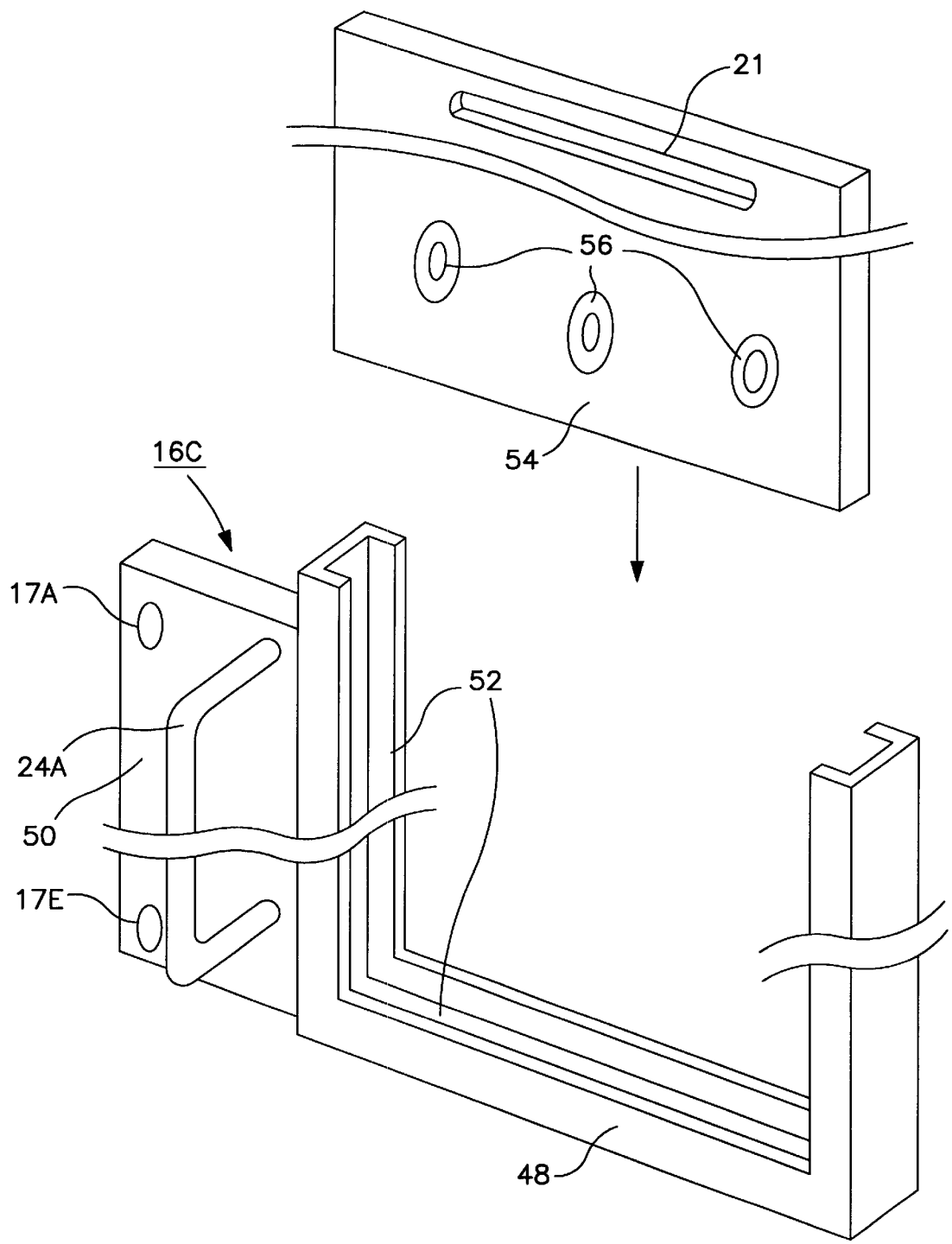
FIG. 7 shows an embodiment in which the clamp section of the jaws are replaceable.

For example, FIGS. 6–7 show another version of the invention which is adapted to guide tools such as drills and routers to form recesses for mounting fixtures onto doors other than the holes, 12, 14 shown in FIG. 1.

FIG. 6 shows a center block 18C in which a guide hole 15C is an oblong slot.

FIG. 7 shows a jaw 16C in which a frame 48 to which the handle section 50 is joined. Frame 48 has grooves 52 for accepting changeable template 54. The holes 17A, B for mounting onto guide rods 20A,B are shown. Template 54 has hardened bushings 56 for guiding a drill drilling holes in the door 10. Template 54 is shown having an oblong slot 21 which serves as a guide for a router that is used to form a recess slot (not shown) in the door. The template 54 is changeable and therefore selected according to the hole pattern required for the door 10.

I claim:
1. A tool jig for drilling a knob hole in a door and for drilling a lock hole in an edge of said door which comprises:
a pair of jaws;
a pair of parallel guide rods;
each said jaw slidably mounted on said pair of guide rods with said centerline of said each knob hole being parallel to said guide rods;
a pair of springs, one said spring of said pair of springs mounted on one rod and said other spring of said pair of springs mounted on another rod of said pair of rods in operable arrangement to provide that said pair of springs force said jaws to slide toward one another;
a center block;
said center block having one slot in one end and another slot in another end;
said center block having one aperture through said one end and another aperture through said another end;
said one and another apertures each intersecting said slots in said respective ends of said centerblock;
one ear having one aperture and mounted on said one jaw and. another ear having another aperture and mounted on said another jaw;
one said ear positioned in one said slot with said one aperture in said one ear aligned with said aperture in said one end of said centerblock;
said another ear positioned in said another slot with said another aperture in said one ear aligned with said another aperture in said another end of said centerblock;
a pair of hinge pins, one hinge pin of said pair of hinge pins slidably mounted in one aperture in said one ear mounted on said jaw and said aperture in one end of said centerblock and another hinge pin of said pair of hinge pins slidably mounted in said another aperture in said another ear on said whereby another jaw and said another aperture in another end of said centerblock whereby one end of said centerblock is hingably attached to one said jaw and another end of said center block is hingably attached to said other jaw;
said center block having a lock hole adapted for guiding a tool for cutting a lock hole;
each said jaw having a guide hole for guiding a hole saw cutting a knob hole in said door;
said center block arranged in operable combination with said jaws to enable clamping said drill jig on an edge of said door with one said jaw against one side of said door and another said jaw against another side of said door and a surface of said center block abutting an edge of said door providing that said guide holes in said jaws for guiding said hole saw be positional to cut said knob hole and a second hole saw be guideable by said lock hole in said center block to cut said lock hole in said edge of said door;
a clamp plate slidably mounted on said pair of rods;
a lever pivotally mounted on said clamp plate to turn about an axis perpendicular to said lever, and perpendicular to said guide rods;
said lever having a cam surface on one end of said lever operably arranged to provide that, when said lever is oriented to one position, said cam surface is free and when said lever is oriented to another position, said cam surface is forced against one of said jaws whereby said jaws are clamped onto said guide rods.

2. The tool jig of claim 1, wherein:
each hinge pin of said pair hinge pins has an indent at one location and another indent at another location;
a pair of balls, one of said balls in a recess in one jaw and another one of said balls in a recess in said other jaw, each said ball spring biased against a respective one of said hinge pins operably arranged to permit slidably positioning said center block corresponding to said one location and said second location, each said location setting a required distance of said surface of said centerblock to said centerline of said knob aperture according to a required distance of said knob hole from said edge of said door.

3. A tool jig for guiding a tool machining a first pattern of at least one recess in a broad surface of a door and for machining a second pattern at least one recess in an edge surface of said door which comprises;
a pair of jaws, each jaw having a jaw sections joined to a handle section;
each said jaw section having holes arranged according to said first pattern providing a guide for the tool when machining the broad surface of the door;
means for coupling said pair of jaws together in an operable arrangement which permits clamping said door between said jaw sections;
said means for coupling having an array of holes arranged according to said second pattern providing a guide for guiding the tool in machining the second pattern of recesses in an edge surface of said door;
said means for coupling arranged in operable combination with said jaws to provide that said array of holes arranged according to said second pattern is centered with respect to said edge surface of said door;
a pair of parallel guide rods inserted slidably through holes in each said handle section;
a pair of springs, one said spring of said pair of springs mounted on one guide rod of said pair of guide rods and said other spring of said pair of springs mounted on another guide rod of said pair of guide rods in operable arrangement to provide that said pair of springs force said jaws to slide toward one another.

4. The tool jig of claim 3 in which said first pattern is a knob aperture in each jaw section aligned with said knob aperture in said other jaw section and each said jaw is slidably mounted on said pair of guide rods through said handle section with said centerline of said each knob aperture being parallel to said guide rods.

5. The tool jig of claim 4 wherein said coupling means further comprises:
a center block having means for hingably attaching one end of said centerblock to one.said jaw and another end of said center block to said other jaw;
said array of holes in said means for coupling being a guide hole in said center block for machining a lock hole in an edge surface of said door;
said center block arranged in operable combination with said jaws to enable positioning said tool jig on said edge of said door with one said jaw against one side of said door and another said jaw against another side of said door and a surface of said center block abutting said edge surface of said door providing that a first tool is positionable to cut said first pattern of holes guided by said knob apertures and a second tool is positionable to cut said lock hole in said edge surface of said door.

6. The tool jig of claim3 which further comprises a clamp means for clamping each said jaw onto said pair of rods at a selected distance from said other jaw.

7. The tool jig of claim 6 wherein said clamp means comprises
a clamp plate slidably mounted on said pair of rods;
a lever pivotally mounted on said clamp plate to turn about an axis perpendicular to said lever and perpendicular to said guide rods;
said lever having a cam surface on one end of said lever operably arranged to provide that, when said lever is oriented to one position, said cam surface is free and when said lever is oriented to another position, said cam surface is forced against one of said jaws whereby said jaws are clamped onto said guide rods.

8. The tool jig of claim 5 wherein said means for hingably attaching one end of said centerblock to one said jaw and another end of said center block to said other jaw comprises:
said center block having one slot in one end and another slot in another end;
said center block having one aperture through said one end and another aperture through said another end;
said one and another apertures each intersecting said slots in said respective ends of said centerblock;
one ear having one aperture and mounted on said one jaw and another ear having another aperture and mounted on said another jaw;
one said ear positioned in one said slot with said one aperture in said one ear aligned with said aperture in said one end of said centerblock;
said another ear positioned in said another slot with said another aperture in said one ear aligned with said another aperture in said another end of said centerblock;
a pair of hinge pins, one hinge pin of said pair of hinge pins slidably mounted in said one aperture in one ear on said one jaw and said one aperture in one end of said centerblock and another hinge pin of said pair of hinge pins slidably mounted in said another aperture in said another ear on said another jaw and said another aperture in said another end of said centerblock, whereby one end of said centerblock is hingably attached to one said jaw and another end of said center block is hingably attached to said other jaw.

9. The tool jig of claim 8 wherein:
said one slot and another slot each has a width that is larger than said respective one ear and another ear enabling said centerblock to be slidably positioned on said pair of hinge pins;
each hinge pin of said pair hinge pins has an indent at one location and another indent at another location;
a pair of balls, one of said balls in a recess in one ear and another one of said balls in a recess in said another ear;
each said ball spring biased against a respective one of said hinge pins operably arranged to permit slidably positioning said center block corresponding to said one location and said second location, each said location setting a required distance from said centerblock to said centerline of said knob aperture according to a required distance of said knob hole from said edge of said door.

10. The tool jig of claim 3 wherein said jaw comprises:
a template having openings corresponding to said first pattern;
a frame being three elongated channel members arranged in operable combination with said template to permit engaging said template in said frame.

* * * * *